United States Patent
Van Der Klaauw et al.

(10) Patent No.: US 7,390,375 B2
(45) Date of Patent: Jun. 24, 2008

(54) METHOD AND A DEVICE FOR CONNECTING A PLASTIC CONDUIT AND A PLASTIC SOCKET

(75) Inventors: Guido Petrus Johannes Van Der Klaauw, Hilversum (NL); Harold Marcel Blom, Houten (NL); Bart Jan Bax, The Hague (NL)

(73) Assignee: Heineken Technical Services B.V., Zoeterwoude (NL)

( * ) Notice: Subject to any disclaimer, the term of this patent is extended or adjusted under 35 U.S.C. 154(b) by 0 days.

(21) Appl. No.: 10/505,492

(22) PCT Filed: Feb. 21, 2003

(86) PCT No.: PCT/NL03/00173

§ 371 (c)(1),
(2), (4) Date: May 16, 2005

(87) PCT Pub. No.: WO03/070451

PCT Pub. Date: Aug. 28, 2003

(65) Prior Publication Data

US 2005/0199338 A1  Sep. 15, 2005

(30) Foreign Application Priority Data

Feb. 22, 2002   (NL) .................................. 1020046

(51) Int. Cl.
*B29C 65/00* (2006.01)
*B32B 37/00* (2006.01)
*F16L 21/00* (2006.01)

(52) U.S. Cl. .................... 156/293; 156/294; 156/304.1; 156/304.2; 156/304.6; 285/231; 285/233; 285/234; 285/275; 285/278; 285/288.1; 285/399; 285/405; 285/416

(58) Field of Classification Search .................. None
See application file for complete search history.

(56) References Cited

U.S. PATENT DOCUMENTS

| | | | |
|---|---|---|---|
| 3,144,495 A | | 8/1964 | Makowski |
| 3,557,520 A | | 1/1971 | O'Hare et al. |
| 4,339,868 A | | 7/1982 | Mazzer |
| 4,511,426 A | | 4/1985 | Linner |
| 4,670,207 A | * | 6/1987 | Yamada et al. ............... 264/248 |
| 5,241,157 A | * | 8/1993 | Wermelinger et al. ........ 219/243 |
| 5,879,723 A | | 3/1999 | Stachowiak |

FOREIGN PATENT DOCUMENTS

| | | | |
|---|---|---|---|
| JP | 2-24114 | * | 1/1990 |
| JP | 06226854 | * | 8/1994 |

* cited by examiner

*Primary Examiner*—Justin Fischer
(74) *Attorney, Agent, or Firm*—Young & Thompson

(57) ABSTRACT

A method and a device for connecting a plastic line part in a plastic socket. A head end (9) of the line part (6) is heated contactlessly all the way round until the end curls over to a diameter that is greater than the inside diameter of the socket (5). The line part is then pushed into the socket without using a mandrel or insert, so that the head end (9) forms a liquid-tight fused connection of high tensile strength with molten wall material of the socket (5).

5 Claims, 5 Drawing Sheets

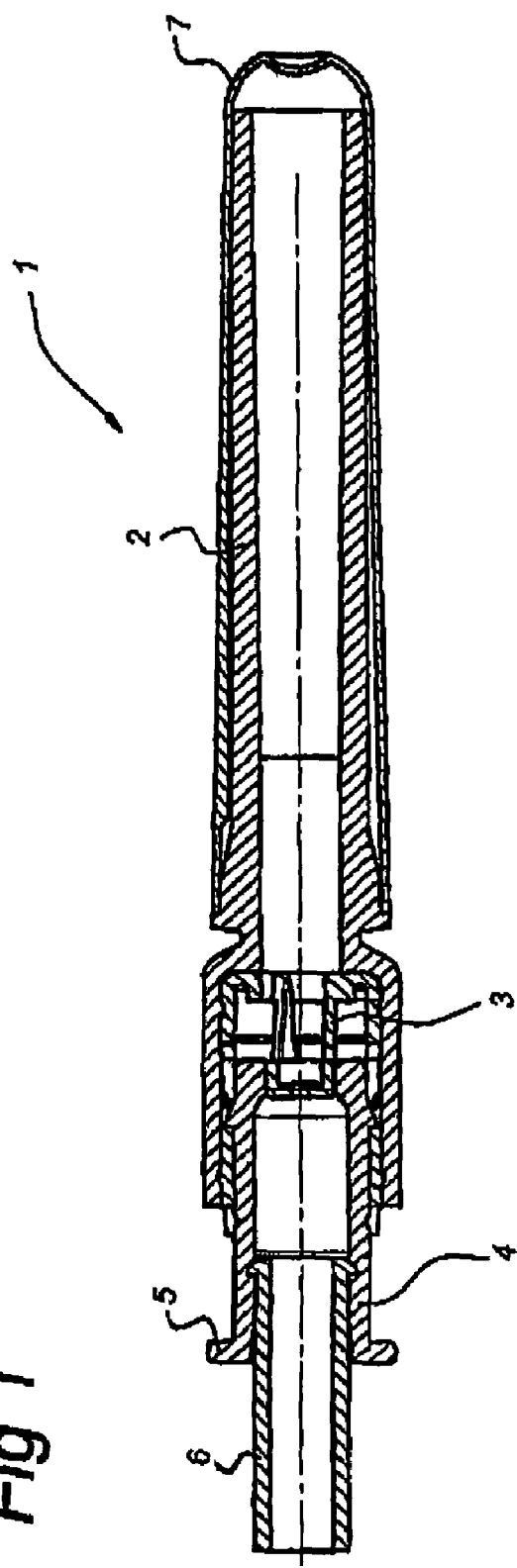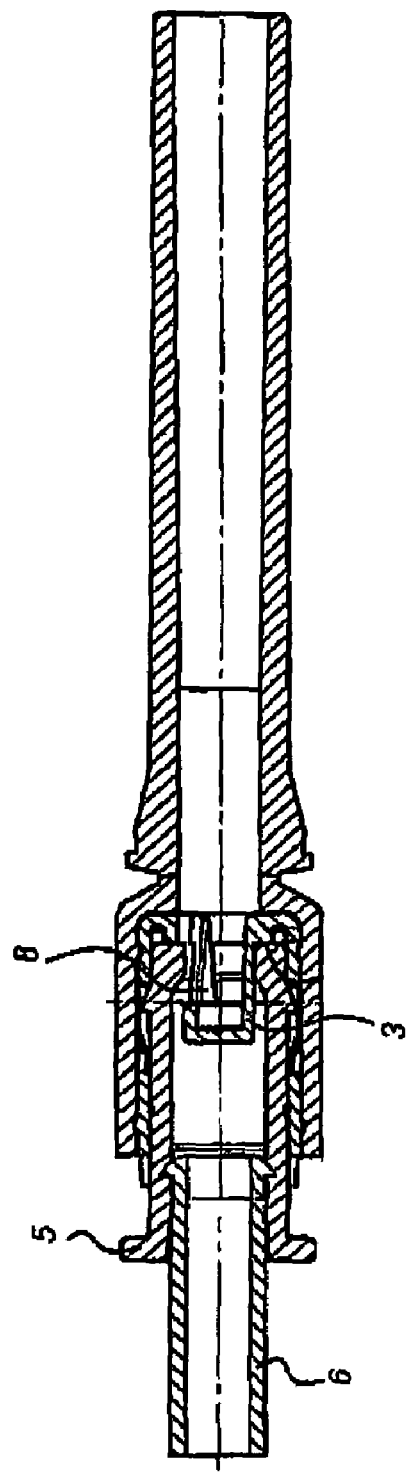

METHOD AND A DEVICE FOR CONNECTING A PLASTIC CONDUIT AND A PLASTIC SOCKET

The invention relates to a method for connecting a plastic line to a plastic socket with an inside diameter, which line has an outside diameter, in the case of which method an end part of the line is heated, after which the heated line part is pushed into the socket and cools down there to form a thermal connection.

It is known to connect a plastic line made of a plastic that melts at a relatively low temperature, such as, for example, PP or PE, to a plastic socket with a higher melting point by placing a metal insert or sleeve in the head end of the plastic line, heating the end by contact with a heating element, and pushing the plastic line with the sleeve into the socket. The socket is likewise heated internally by inserting a cylindrical heating element into the socket. The wall material of the socket deforms during the insertion of said element, and the insert, which is left behind in the line, forms a liquid-tight seal. A disadvantage of the known method is that the through-flow diameter through the insert is reduced, so that the flow resistance will increase and turbulence may arise in the liquid flowing through the line into the socket. This is a problem particularly in the case of carbonated beverages, such as, for example, beer, if the socket forms the outflow part of a flexible beer line, in which case transitions in the throughflow diameter can lead to undesirable foam formation.

Furthermore, the metal inserts cause problems during reuse of the plastic parts, and when such an insert is inserted as an extra part this constitutes a cost-increasing measure.

Finally, during heating of the end of the line by direct contact of said line with a heating element the plastic is damaged and connections that are unsuitable for coming into contact with foodstuffs are produced. There is further the risk of molten plastic being left behind on the heating element and/or on the mandrel introduced into the line. The fitting of the insert in order to prevent the line from collapsing constitutes a relatively complex operation, which slows down the production rate.

It is an object of the present invention to provide a method for connecting a plastic line to a plastic socket in the case of which the abovementioned disadvantages are avoided.

It is a further an object of the invention to provide a method and a device for connecting a plastic line to a plastic socket in a reliable and fluid-tight (gas-tight and/or liquid-tight) manner.

To that end, the method according to the invention is characterized in that the this method comprises the steps of:
  contactessly heating the end part of the line, in which case the heat transfer is substantially homogeneous around the circumference of the end part;
  curling over a head end of the end part so that a flange with a diameter that is greater than the inside diameter of the socket is formed; and
  inserting the head end of the line into the socket, in which case wall material of the inside wall of the socket is pushed up to a position situated at a distance from an end face of the socket, as a result of which a liquid-tight connection is formed by the curled-over end edge of the line and pushed-up wall material of the socket.

Curling over the head end of the plastic line produces a part that is softened by heat and has a greater diameter than the inside diameter of the socket. During insertion into the socket said curled-over head end, or "mushroom", takes the wall material of the socket along with it up to predetermined insertion length beyond the head end of the socket. When a certain insertion length inside the socket has been reached, the curled-over head end solidifies, as does the pushed-up wall material of the socket, and said material bonds together, so that a liquid-tight and gas-tight seal is formed. The part of the line situated directly behind the curled-over head end provides sufficient rigidity to push the head end of the line into the socket, thereby clamping it in, without the need for an inside sleeve or insert. Owing to the fact that the reinforcing metal insert on the head end of the plastic line is no longer needed, material is saved and the cost of the seal can be reduced. Finally, no contact heating of the plastic line is carried out, so that decomposition of the plastic material is no longer possible, no harmful connections are formed and no plastic residues are left behind on the device for connecting the socket and line, so that the maintenance on the device is low.

In one embodiment the end part of the line in rotation about its longitudinal axis is kept stationary, and an annular heating element is placed around the end part. In order to produce homogeneous heating, a radiant heating element is used, so that inhomogeneity in the heating as a result of convection is prevented. The radiant heating element can comprise, for example, an annular metal element that encloses the end of the plastic line. The end of the plastic line can be moved in the longitudinal direction into the heating cavity of the metal element. It is likewise possible to make the brass heating element such that it pivots, so that it can pivot open in two halves for the purpose of inserting the end part of the plastic line in the radial direction. In order to obtain a reliable connection, prior to the insertion of the end part of the line into the socket a heating element is placed in the socket, for the purpose of heating the inside of the socket. This softens the plastic wall material of the socket, so that it is pushed up easily, with the result that the materials of the curled-over head end of the plastic line and the wall material of the socket an together easily. In an advantageous manner a needle-type nozzle with an annular groove and a deflector situated at a distance from it is inserted into the socket, so that an annular groove is formed in the inside wall of the socket, which annular groove is filled up by the curled-over head end of the line.

The outside diameter of the plastic line can be smaller than the inside diameter of the socket, but is preferably greater than or equal to the inside diameter of the socket, so that a press fit is obtained.

A device for connecting a plastic socket to a plastic line at high speed comprises:
  a clamping slide for clamping an end part of the line along a line path;
  a holder situated near the clamping slide, in line with the line path, for accommodating a socket, the clamping slide and the holder being movable relative to each other;
  a heating unit with an annular heating cavity and with a movement element for moving the heating unit between a withdrawn position and a working position situated in line with the line path, between the clamping slide and the holder.

Various clamping elements and holders are preferably fixed on their carrousel, which is rotatable along the heating unit. In an advantageous embodiment, two assemblies of clamping slide, holder and heating unit are provided at a distance from each other in line with the line path, for the purpose of simultaneously fitting a socket on both ends of the line. The method and the device according to the invention are particularly suitable for fitting a bottle tap valve on the end of a plastic line, as described in NL 1015368 in the name of the Applicant, or for fitting a plastic dispense adapter; as described in NL 1016687, likewise in the name of the Applicant. In this case the plastic line is made of, for example, polyethylene, while the material of the plastic socket is polypropylene with a welding plate temperature of approximately 390° C.

A number of embodiments of the method and the device according to the invention will be explained in greater detail with reference to the appended drawing. In the drawing:

FIGS. 1 and 2 show a longitudinal section of a shutoff valve of a beer line in the case of which a plastic line is attached to a plastic socket according to the invention;

Figure 3:
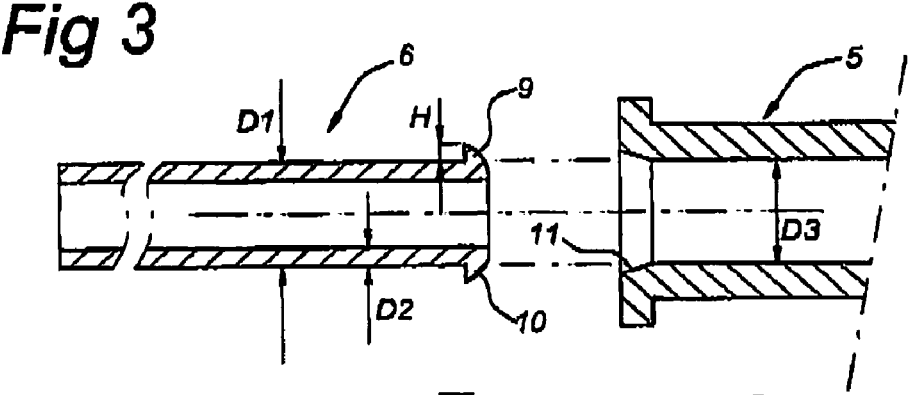
FIG. 3 shows a diagrammatic longitudinal section of a plastic line with curled-over head end and plastic socket prior to connection.

FIG. 1 shows a shutoff valve 1 for use in a beer line such as that described in NL-1015368 in the name of the Applicant. The shutoff valve 1 is made completely of plastic and comprises an outflow tube 2, a shutoff lug 3 and a moveable socket 4, which is slidable in the axial direction relative to the shutoff lug 3. The socket 4 is provided with a flange 5 for engaging with an operating mechanism of a tap handle. A flexible line 6 is connected in a liquid-tight manner to the socket 4. The line 6 is made of, for example, polyethylene, and has a wall thickness of 1 mm and an outside diameter of 6.2 mm. The socket 5 is made of polypropylene.

FIG. 2 shows a shutoff valve 1 in an open state, a protective cap 7 having been removed, and the socket 5 having been slid relative to lug 3 in such a way that an outflow aperture 8 is opened and the line 6 is in fluid communication with outflow tube 2.

Figure 4:
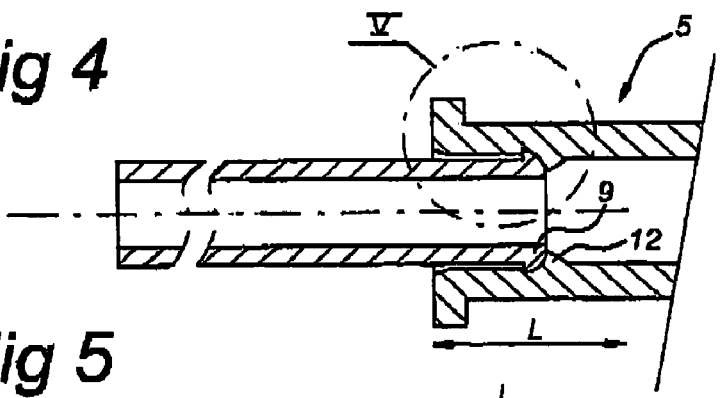
FIG. 4 shows the thermally fused line and socket according to FIG. 3 in the assembled state.

FIG. 3 shows the line 6 with outside diameter D1 of 6.2 mm and a wall thickness D2 of 1 mm. The head end 9 is curled over by heating it contactlessly all the way round with an annular heating element. It has been found that use of annular radiant heater in the form of a heated brass block with a circular cavity having a diameter of, for example, 10 mm heated to a temperature of approximately 400° C. produces automatic and uniform curling-over of the head end 9 until a rounded shoulder 10 is formed which shoulder projects over a height H of 1 to 2 mm relative to the outside wall of the line 6. The line 6 is held stationary during the heating. The head end 9 is soft and fluid after hunting and can then be inserted into the socket 5 with an inside diameter D3 of 5.8 mm. For insertion of the end part of the plastic line 6 into the socket 5 in a directed manner, said socket 5 is provided with a beveled run-up edge 11. During the insertion of the line part 6, the line situated directly behind the head end 9 gives sufficient rigidity to permit pushing of said head end over a length L of several millimeters, such as, for example, 3 to 4 millimeters, into the socket 5. During the insertion of the line part 6 into the socket 5 the curled-over head end 9 has a greater diameter than the inside diameter D3 of the socket. During the insertion the soft and fluid curled-over head end 9 deforms and on contact with the inside wall of the socket 5 causes said wall to melt and pushes wall material up along the length L. At a distance of several millimeters from the inlet of the socket 5 the curled-over edge 9 and the pushed-up wall material of the socket solidifies, so that a fused connection is formed. This is shown in FIG. 4 and in detail in FIG. 5, in the case of which it can be seen clearly that the deformed curled-over edge 9 forms a fused connection 16 with pushed-up wall material 12 of the socket 5, so that a liquid-tight and gas-tight connection is formed. The wall thickness D4 of the socket 5 can be, for example, 3 mm, while the wall thickness D5 of the turned-up part of the socket 5 is 1.4 mm. It has been found that a very reliable liquid-tight, gas-tight and tension-resistant connection can be formed simply and quickly between the curled-over head end 9 and the pushed-up wall material 12 of the socket 5.

Figure 5:
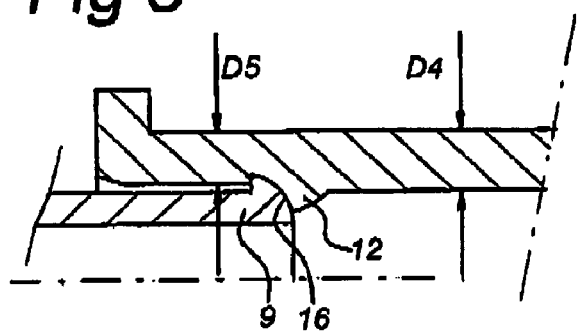
FIG. 5 shows a detail of the fused connection according to FIG. 4.

The tensile force that can be absorbed by the connection, as shown in FIGS. 4 and 5, is, for example, 80 N.

Figure 6:
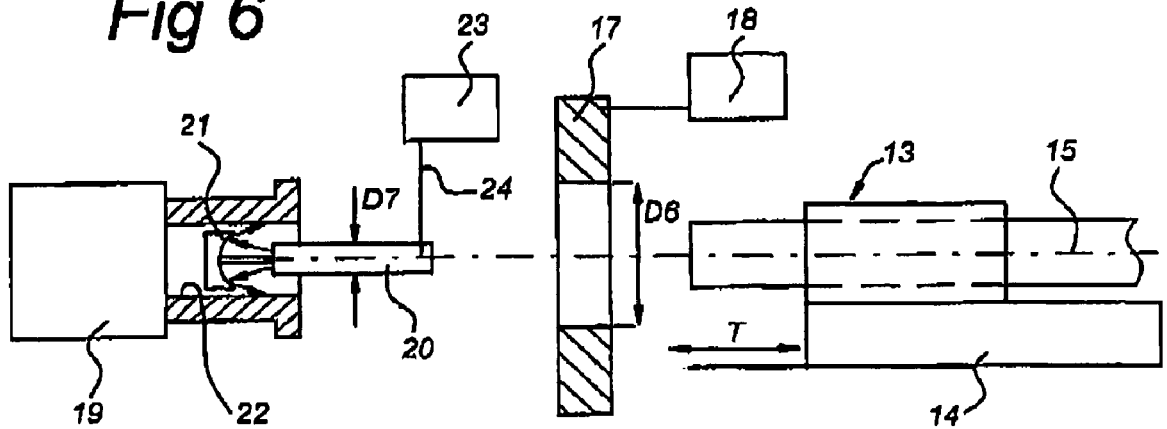
FIG. 6 shows a diagrammatic view of a device for carrying out the method according to the invention.

FIG. 6 shows diagrammatically a device for connection of the plastic socket 5 to the end part 13 of the plastic line 6. The plastic line 6 is clamped in a clamping slide 14, which is movable in the direction of the arrow T along a line path 15. An annular heating element 17 is controlled by way of temperature regulating unit 18 and heated to a temperature of, for example, approximately 400° C. The heating element 17 is, for example, in the form of a brass block with an opening that as a diameter D6 of, for example, 10 mm. The heating element can be moved crosswise to the line path 15. The socket 5 is clamped in a holder 19. A nozzle 20 is inserted into the socket 5 and by way of a deflector 21 heated compressed air is blown onto the inside wall 22 of the socket 5, so that an annular groove is formed. Instead of compressed air, another gas can also be used, such as, for example, nitrogen if oxidation at high temperatures has to be prevented. The compressed air is fed to the nozzle 20 by way of a regulating unit 23 and (flexible) line 24, which nozzle is of a seam-type design with a diameter D7 of, for example, 2 mm. The nozzle 20 is movable along the line path 15 and likewise crosswise to said path. After heating of the inside wall 22 of the socket 5 and of the end part 13 of the line 15 for the purpose of forming a curled-over head end, as shown in FIG. 3, the nozzle 20 and the heating element 17 are withdrawn crosswise to the line path 15, and the clamping slide 14 is moved to the socket 5, and the end part 13 of the line is inserted into the socket 5, so that a connection such as that shown in FIG. 4 is produced.

Figure 7:
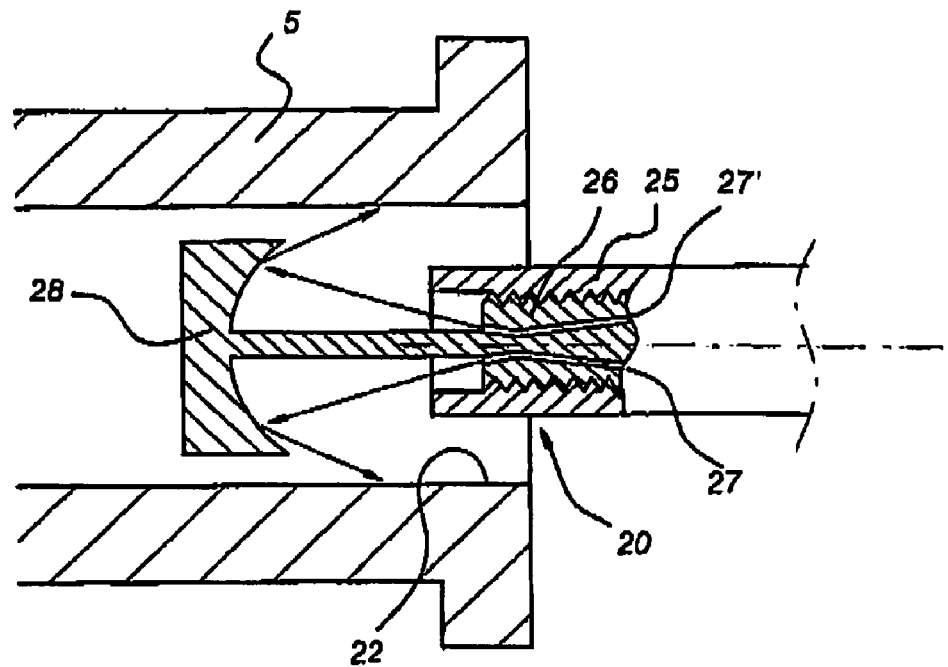
FIG. 7 shows a detail of a nozzle for heating the inside wall of the socket.
Figure 8:
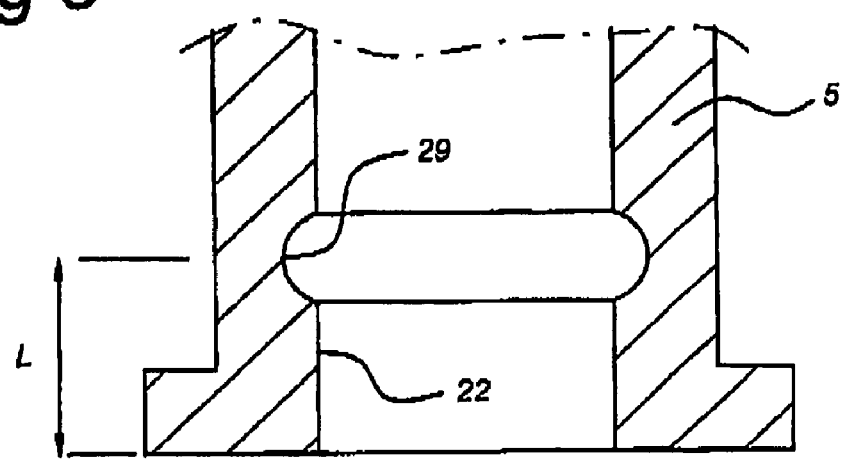
FIG. 8 shows a detail of an annular groove for the inside of the socket.

FIG. 7 shows in detail the nozzle 20 inside the socket 5 for the purpose of local heating of the inside wall 22 of the socket 5. The nozzle 20 comprises a core 26 with throughfeed channels 27, 27' for heated compressed air. A sleeve 25, which can be moved by way of screw thread in the longitudinal direction, is fitted around the core 26. A deflector 28, which extends above the outflow aperture of the sleeve 25, is fixed on the core 26. In this way the heated compressed air is deflected in the direction of the diagrammatically indicated arrows, and said air falls on the wall of the socket 5, so that an annular groove 29, as shown in FIG. 8, is formed inside the socket 5 at the distance L from the head end of the socket. By relative movement of the socket 25 and the deflector 28, the deflection of the airflow can be influenced, so that the height L at which the groove 29 is formed can be varied. During the insertion of the line 6 into the socket 5, the curled-over head end 9 can fall into the annular groove 29 and fuse there with the locally heated wall material of the socket 5 to form a tension-resistant and liquid-tight connection.

Figure 9:
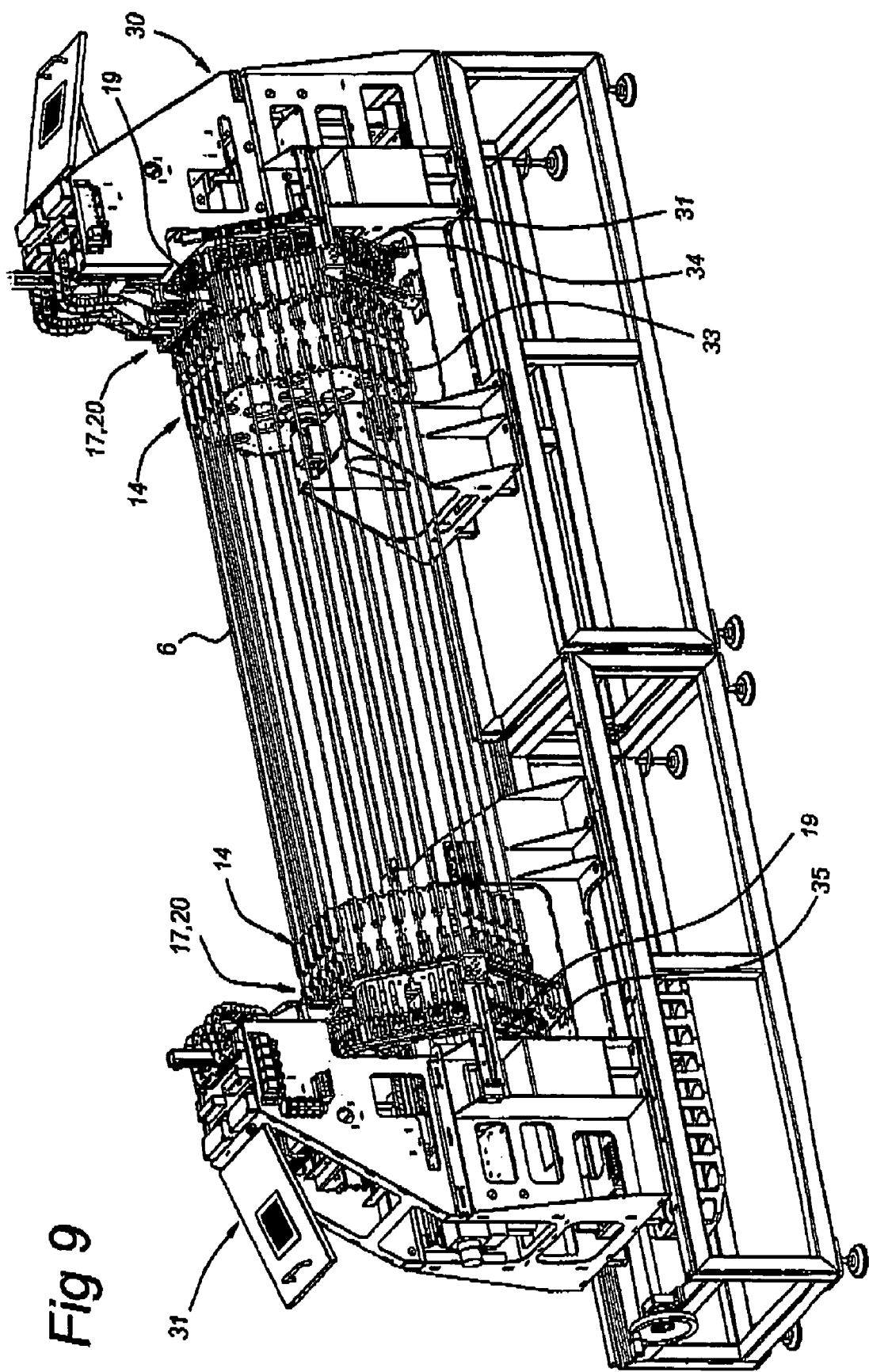
FIG. 9 shows a perspective view of a carrousel welding machine for simultaneously fitting plastic sockets on both ends of five lines.

FIG. 9 shows a view of the device for fitting a plastic socket simultaneously on both sides of five lines 6. The lines 6 are clamped on both sides in a clamping shoe 14, and are heated at both ends by means of heating devices 17, 20. On the side 30 of the device the sockets are produced in the form of disc-shaped dispense adapters 31, as described in NL-1016687 in the name of the Applicant, supplied for connection to the line 6, while on the side 30 of the device socket 5 of a shutoff valve such as shown in FIGS. 1 and 2 are connected to the line 6. The lines 6 are placed in the groups of five on a rotating carrousel 33, so that the lines are clamped in groups and can be rotated to the heating devices 17, 20. After heating of the end parts of the lines 6 and heating of the inside wall of the sockets, the heating devices are withdrawn and the sockets and dispense adapters 31 are pressed onto the lines by movement of the holders 34, 35 of dispense adapter 31 and socket 5 in the longitudinal direction of the lines 6.

Figure 10A:
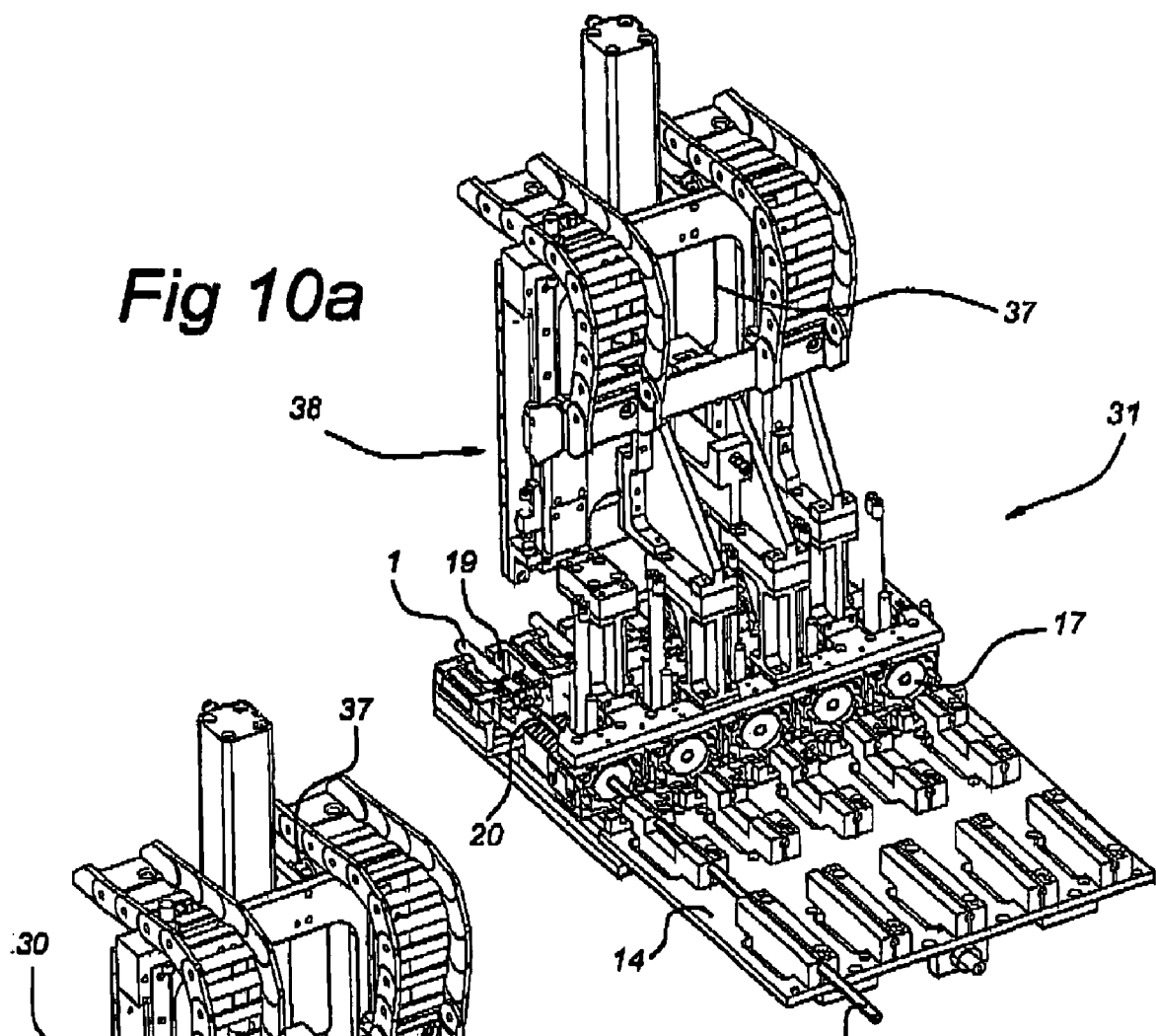
FIGS. 10a and 10b show perspective views of a clamping slide and heating unit according to the invention.
Figure 10B:
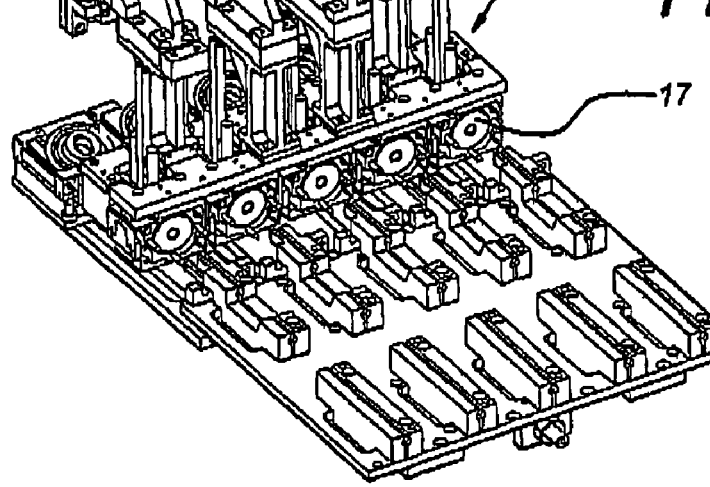

FIG. 10a shows clamping slide 14 with a line 6 and with a shutoff valve 1 clamped in holder 19. The shutoff valve 1 is supplied by way of a tubular structure 37, which is fixed to a supply/heating unit 38 that is movable in a direction perpendicular to clamping slide 14, as shown in FIG. 10b. The annular heating elements 17 and also the nozzle 20, which is provided with heated compressed air by way of lines 24, are fitted on the unit 38. After the unit 38 has been placed above the clamping slide 14 and a shutoff valve 1 is fitted in the holder 19, the unit 38 is moved relative to the clamping slide 14 in the longitudinal direction of the lines, so that the end part of the lines comes to rest inside the annular heating elements 17 in such a way that the nozzles are taken inside the shutoff valve 1. After heating of the end part of the line 6 and the inside wall of the shutoff valve 1, the unit 38 is moved again in the longitudinal direction of the line 6 until the end of the line is situated outside the annular heater 17 and the nozzle has been withdrawn from the shutoff valve 1 and the unit 38 is removed from the line path in a manner crosswise to the clamping slide 14, after which the line 6 is moved relative to the holder 19, so that the line is pushed into the inside of the socket of the shutoff valve 1 and in this way forms a tension-resistant and liquid-tight fused connection.

The invention claimed is:

1. A method for connecting a flexible plastic line (6) to a plastic socket (5) with an inside diameter (D3), which line has an outside diameter (D1), in the case of which method an end part of the line is heated, after which the heated line part is pushed into the socket and cools down there to form a thermal connection (16), characterized in that the method comprises the steps of:
   contactlessly heating the end part of the line, in which case the heat transfer is substantially homogeneous around the circumference of the end part;
   curling over a head end (9) of the end part in an outward direction, prior to insertion of the end part into the socket, so that a flange with a diameter that is greater than the inside diameter (D3) of the socket is formed; and
   inserting the head end (9) of the line (6) into the socket (5), in which case wall material of the inside wall of the socket is pushed up in an inward direction to a position situated at a distance (L) from an end face of the socket, as a result of which a liquid-tight connection (16) is formed by the curled-over head end of the line and pushed-up wall material of the socket, wherein prior to the insertion of the end part of the line into the socket a heating element (20) is placed in the socket, for the purpose of heating the inside of the socket, and wherein an annular groove (29) is formed by the heating element (20) in the socket (5), for the accommodation of the curled-over head end (9) of the line (6).

2. The method as claimed in claim 1, wherein the outside diameter (D1) is greater than or equal to the inside diameter (D3) of the socket.

3. The method as claimed in claim 1, wherein during the heating of the end part of the line said end part of the line in rotation about its longitudinal axis is kept stationary, and an annular heating element (17) is placed around the end part.

4. The method as claimed in claim 3, wherein the heating element (17) comprises a radiant heating element.

5. The method as claimed in claim 1, wherein the heating element (20) comprises a nozzle with an annular slot and a deflector (28) situated at a distance from the slot, so that a hot fluid is blown by way of the nozzle and the deflector onto the inside wall (22) of the socket (6).

* * * * *